(12) United States Patent
Calabria et al.

(10) Patent No.: US 9,266,582 B2
(45) Date of Patent: Feb. 23, 2016

(54) RIDER-PROPELLED WHEELED VEHICLE

(71) Applicants: Daniele Calabria, Cornedo Vicentino (IT); Arcangelo Sassolino, Vicenza (IT)

(72) Inventors: Daniele Calabria, Cornedo Vicentino (IT); Arcangelo Sassolino, Vicenza (IT)

(*) Notice: Subject to any disclaimer, the term of this patent is extended or adjusted under 35 U.S.C. 154(b) by 0 days.

(21) Appl. No.: 14/394,450

(22) PCT Filed: Apr. 23, 2013

(86) PCT No.: PCT/IB2013/053210
§ 371 (c)(1),
(2) Date: Oct. 14, 2014

(87) PCT Pub. No.: WO2013/160833
PCT Pub. Date: Oct. 31, 2013

(65) Prior Publication Data
US 2015/0076786 A1    Mar. 19, 2015

(30) Foreign Application Priority Data
Apr. 27, 2012   (IT) ............................... VI2012A0102

(51) Int. Cl.
| | |
|---|---|
| B62M 1/00 | (2010.01) |
| A63C 17/00 | (2006.01) |
| A63C 17/01 | (2006.01) |
| A63C 17/12 | (2006.01) |

(52) U.S. Cl.
CPC ............. B62M 1/00 (2013.01); A63C 17/006 (2013.01); A63C 17/0093 (2013.01); A63C 17/01 (2013.01); A63C 17/015 (2013.01); A63C 17/12 (2013.01); A63C 2203/10 (2013.01); A63C 2203/40 (2013.01)

(58) Field of Classification Search
CPC ............ B62M 1/00; B62M 1/24; B62K 3/00; A63C 17/0093; A63C 17/01; A63C 17/12

USPC ......................................................... 280/220
See application file for complete search history.

(56) References Cited

U.S. PATENT DOCUMENTS

| | | | | |
|---|---|---|---|---|
| 3,035,854 A | * | 5/1962 | Johnston ................ | B62M 11/00 280/11.115 |
| 3,436,088 A | * | 4/1969 | Kunselman ............ | A63C 5/035 280/14.21 |
| 4,076,270 A | * | 2/1978 | Winchell ................ | B62B 13/12 180/208 |
| 4,353,566 A | * | 10/1982 | Mohlenbrock ........ | A63C 17/01 280/11.28 |
| 4,540,192 A | * | 9/1985 | Shelton .................. | B62K 3/002 280/220 |
| 6,505,845 B1 | * | 1/2003 | Fong ...................... | A63C 17/12 280/220 |
| 6,517,093 B2 | * | 2/2003 | Feng ...................... | B62K 15/006 280/87.042 |
| 7,549,655 B2 | * | 6/2009 | Fan ........................ | B62K 3/002 280/87.041 |

(Continued)

FOREIGN PATENT DOCUMENTS

WO    2010138227    12/2010

*Primary Examiner* — Kevin Hurley
*Assistant Examiner* — Michael Stabley
(74) *Attorney, Agent, or Firm* — Themis Law

(57) ABSTRACT

A rider-propelled wheeled vehicle includes a support surface for supporting a user's feet, which defines a longitudinal axis, a pair of front wheels and a pair of rear wheels associated with the support surface, a system for rotatably connecting the rear wheels to the support surface, and adapted to allow their oscillation about a first oscillation axis inclined with respect to the support surface. The rear wheels have respective first pivot axes independent of and transversally offset from each other for at least partial transfer of the propulsion exerted by the user on the support surface to such wheels and for generation of a reaction substantially parallel to the plane to thereby promote a forward motion of the structure.

11 Claims, 7 Drawing Sheets

(56) References Cited

U.S. PATENT DOCUMENTS 8,328,209 B2* 12/2012 Tsai ................. B62K 3/002
 280/87.042

8,632,084 B2* 1/2014 Lovley, II .............. B62K 3/002
 280/87.041

2011/0169234 A1 7/2011 Jeon

* cited by examiner

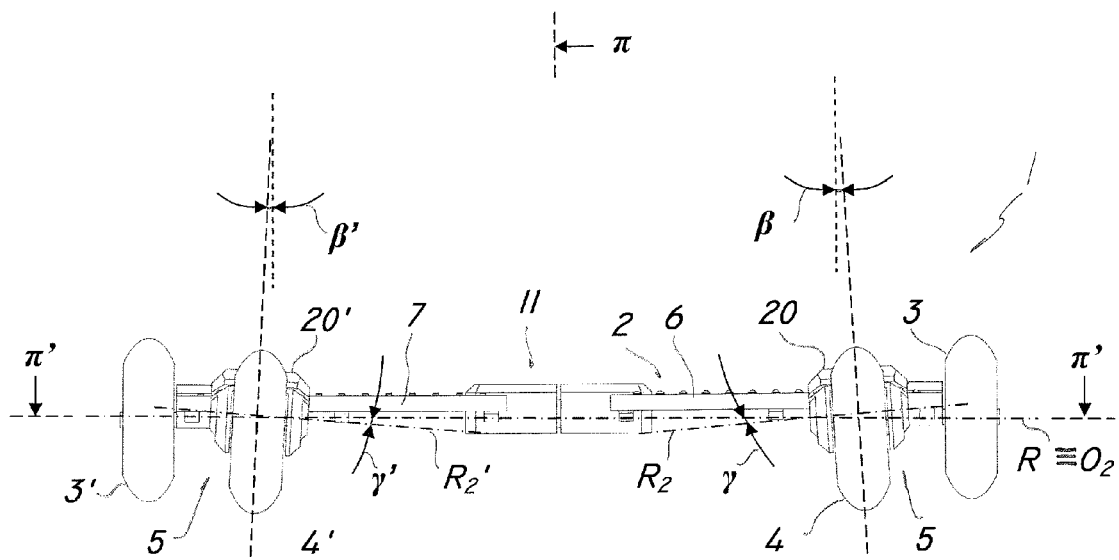
FIG. 11
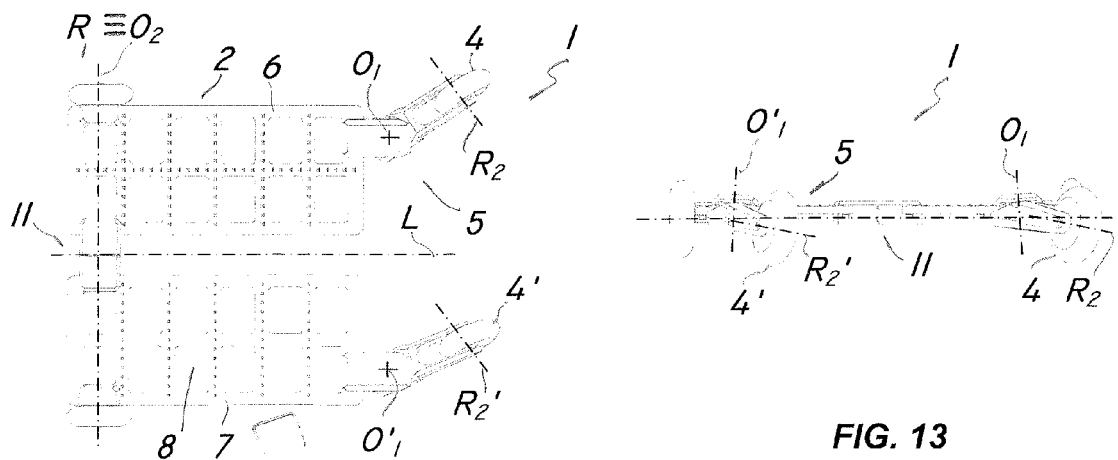
FIG. 12
FIG. 13

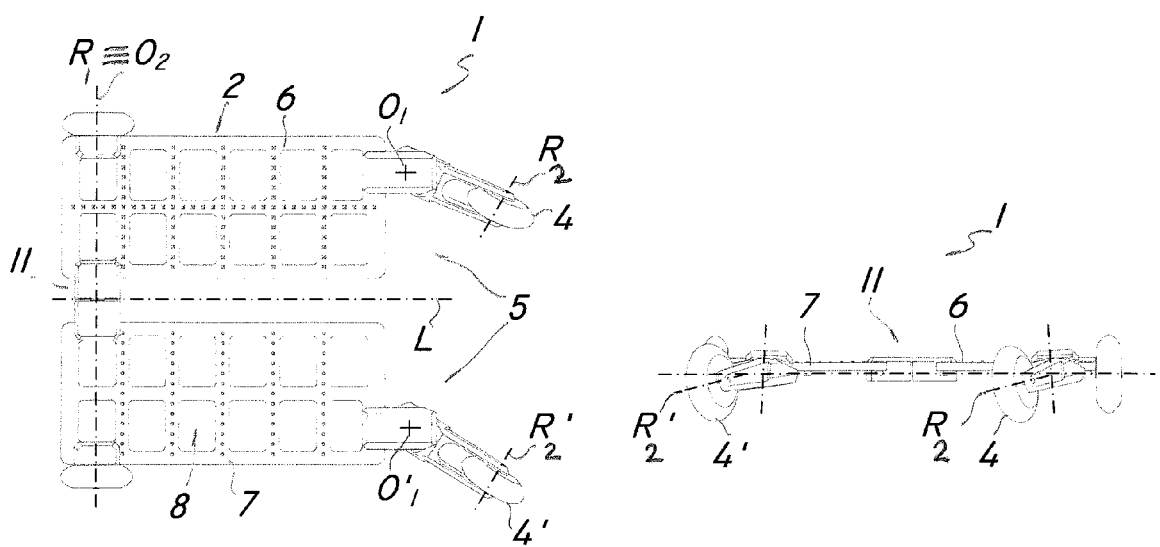
FIG. 14          FIG. 15

RIDER-PROPELLED WHEELED VEHICLE

FIELD OF THE INVENTION

The present invention generally finds application in the field of vehicles and particularly relates to a rider-propelled vehicle structure.

BACKGROUND ART

Rider-propelled wheeled vehicles generally known as skateboards are known to comprise a footrest board associated with a pair of front wheels and a pair of rear wheels.

Typically, the wheels are mounted to rotate about respective axes of rotation, that are stationary with respect to the footrest board, whereby the user is required to continuously thrust off the ground with one of his/her feet, with a given thrust frequency, to propel the vehicle forward.

As a result, this kind of vehicles is only designed for play or sports purposes, and cannot be considered as a light city vehicle proper, adapted for used also for relatively long times and distances.

Furthermore, the footrest board generally has a narrow and elongate shape, ensuring improved aerodynamic properties, but affecting comfort, because the user is required to place his/her feet transverse to the longitudinal direction of the board.

WO2010138227 discloses a skateboard that partially improves the above configurations, by allowing the vehicle to be used without pushing off of the ground, by synchronized action of the lower limbs of the user.

In order to achieve this effect, both front and rear wheels have their respective axes of rotation susceptible of oscillating about corresponding pivot axes inclined with respect to the support board.

Particularly, each pair of wheels has a common oscillation axis, whereby when one of the wheels of the pair moves forward, the other moves rearward.

Furthermore, the wheel support means are configured to allow each wheel to alternately move forward/away from the support surface, thereby allowing the vehicle to be propelled forward due to the pivotal motion imparted by the user and to the resulting alternate lateral inclination of the support board.

Nevertheless, the resulting forward motion is a serpentine motion with sharp curves, which limits use as a city vehicle, because it does not allow the user to assume a stable position, namely at increased speeds.

Furthermore, the forward motion also requires the user's feet to be placed in a longitudinally offset position which affects riding comfort.

DISCLOSURE OF THE INVENTION

The object of this invention is to overcome the above drawbacks, by providing a rider-propelled wheeled vehicle structure that achieves high efficiency and relative cost effectiveness.

A particular object of the present invention is to provide a rider-propelled vehicle structure that is relatively stable and adapted to be easily propelled, with relatively little effort, such that it may be also used as a city vehicle.

A further object of the present invention is to provide a rider-propelled wheeled vehicle structure that ensures high user safety and is very easy to use.

A further object of the present invention is to provide a rider-propelled vehicle structure that can be easily steered during use.

Another important object of the present invention is to provide a rider-propelled wheeled vehicle structure that allows the user to assume a comfortable and natural posture for long-time use.

These and other objects, as better explained hereafter, are fulfilled by a rider-propelled wheeled vehicle structure as defined in claim 1.

With this combination of features, the vehicle structure of the invention may be propelled by the user with little effort, and affords reduced movement of his/her lower limbs, allowing highly safe transportation.

Advantageous embodiments of the invention are obtained in accordance with the dependent claims.

BRIEF DESCRIPTION OF THE DRAWINGS

Further features and advantages of the invention will be more apparent from the detailed description of a preferred, non-exclusive embodiment of a rider-propelled wheeled vehicle of the invention, which is described as a non-limiting example with the help of the annexed drawings, in which:

FIG. 11 is a rear view of the structure of FIG. 1;
FIG. 12 is a top view of the structure of the invention in a first motion configuration;
FIG. 13 is a rear view of the structure in the configuration of FIG. 12;
FIG. 14 is a top view of the structure of the invention in a second motion configuration;
FIG. 15 is a rear view of the structure in the configuration of FIG. 14.

DETAILED DESCRIPTION OF A PREFERRED EMBODIMENT

Referring to the above figures, a rider-propelled wheeled vehicle structure is shown, which is generally designated by numeral 1, and is adapted for use both for play and sports purposes, e.g. as a skateboard, and as a light and environment-friendly city vehicle.

Figure 1:
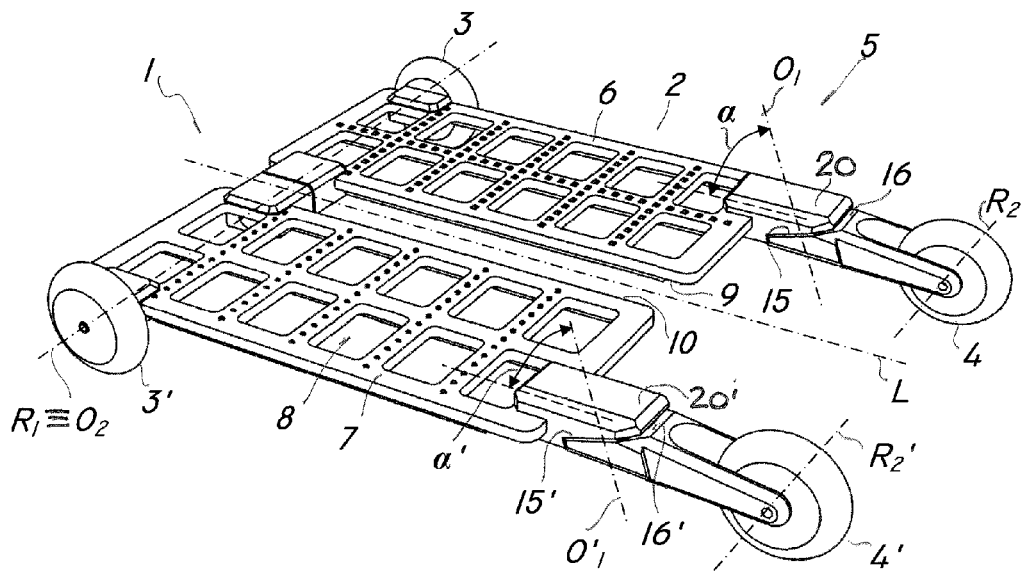
FIG. 1 is a perspective view of a vehicle structure of the invention.
Figure 2:
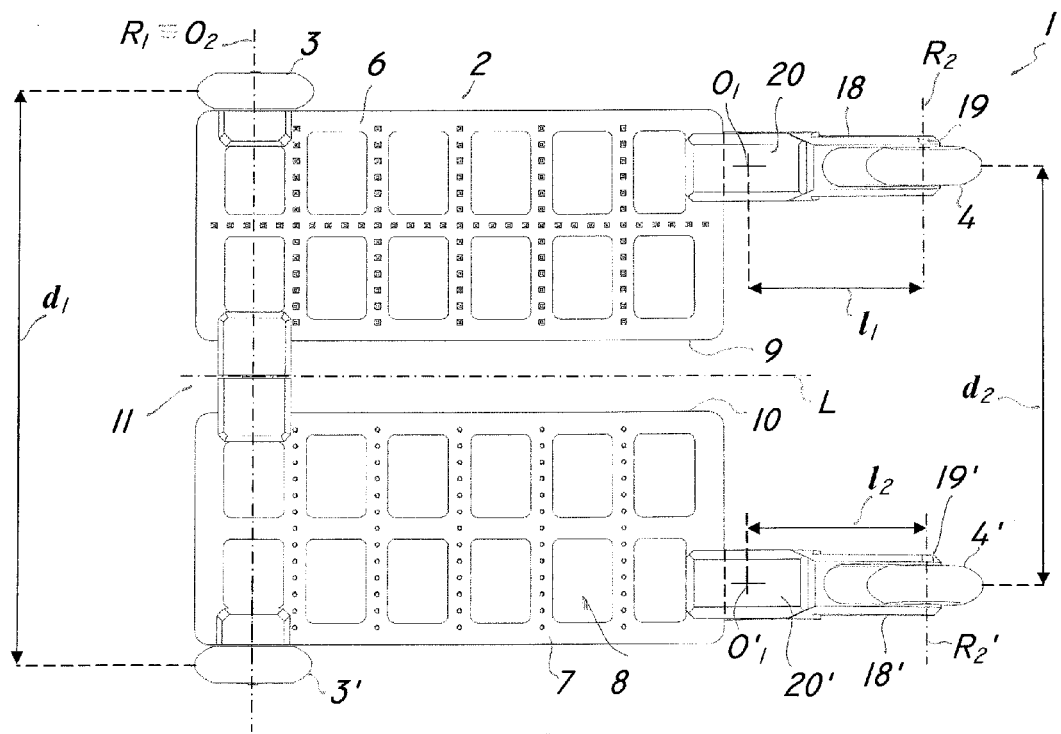
FIG. 2 is a top view of the structure of FIG. 1.

As shown in FIGS. 1 and 2, the vehicle structure essentially comprises a support surface 2 for supporting a user's feet, which defines a longitudinal axis L and has a pair of front wheels 3, 3' and a pair of rear wheels 4, 4' associated therewith.

As is typical for this kind of vehicles, each wheel 3, 3'; 4, 4' is generally idly mounted to a respective substantially transverse rotation axis $R_1$, $R_2$.

Means 5 are further provided for rotatable connection of the rear wheels 4, 40 to the support surface 2. Particularly, these connecting means 5 are adapted to allow the rear wheels 4, 4' to oscillate about an oscillation axis which is inclined to the support surface 2.

According to a peculiar feature of the invention, the rear wheels 4, 4' have respective first oscillation axes $O_1$, $O'_1$, which are independent of and transversely offset from each other.

This will allow at least partial transfer of the propulsion exerted by the user on the support surface 2 to the rear wheels 4, 4', to generate a reaction substantially parallel to the plane, and promote a forward motion of the whole structure 1.

The rear wheels 4, 4' have axes of rotation that are also independent of each other and susceptible of oscillating about their respective first axes of oscillation $O_1$, $O'_1$, as described in greater detail below.

Preferably, the front wheels have a common rotation axis $R_1$, which is fixed with respect to the support surface 2.

Preferably, but without limitation the rear wheels 4, 4' may be transversely offset at a distance $d_1$ that, with the vehicle in a stationary position, is shorter than the transverse distance $d_2$ between the front wheels 3, 3' for improved stability of the whole structure 1 and better cornering control thereof.

Figure 3:
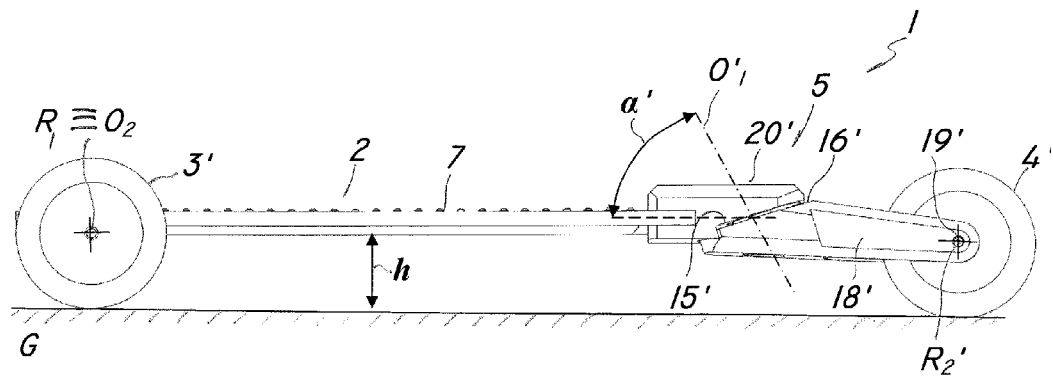
FIG. 3 is a lateral view of the structure of FIG. 1.

As more clearly shown in FIG. 3, the first pivot axes $O_1$, $O'_1$ of the rear wheels 4, 4' are inclined with respect to the support surface 2, and may have substantially the same longitudinal distance $l_1$, $l_2$ from their respective first rotation axis $R_2$, $R_2'$.

Advantageously, the first pivot axes $O_1$, $O'_1$ may be inclined with respect to the support surface 2 at respective predetermined first inclination angles $\alpha$, $\alpha'$.

As shown in FIG. 3, the first inclination angles preferably have the same value, generally ranging from 45° to 85°, preferably from 60° to 80°, and more preferably being close to 70°.

This was found to be an optimal range of values for a reaction F substantially parallel to the support surface 2 to be transferred to the rear wheels 4, 4', and be sufficient to promote the forward motion of the whole structure, while minimizing the inactive components.

FIG. 3 also shows that the support surface 2 has a predetermined height h from the ground G, that may be substantially constant and remain unchanged as the rear wheels 4, 4' pivot, thereby improving user stability during use.

In a particularly advantageous aspect of the invention, the support surface 2 may be divided into a first board 6 and a second board 7, which are substantially planar and symmetrical with respect to a vertical center line $\pi$ of the plane 2.

Each of the plates 6, 7 has a respective front wheel 3, 3' and a respective rear wheel 4, 4' and defines a respective support for a corresponding foot of the user.

Conveniently, the plates 6, 7 have a substantially rectangular shape and are parallel to and transversely offset from each other for parallel positioning of the feet, thereby improving user comfort, by allowing the user to assume a natural posture even during riding.

In order to reduce the overall weight of the structure 1, the boards 6, 7 may have a grid structure or one or more lightening arrangements, generally referenced 8.

Furthermore, in a further configuration, not shown, the plates 6, 7 may be adjustable in length and/or width, e.g. by telescoping arrangements, to fit the size of the user's foot, and allow the heel to be held close to the corresponding rear wheel 4, 4' for improved efficiency of the structure 1.

The first table 6 and the second plate 7 are mutually joined at their mutually facing and parallel longitudinal inner edges 9, 10 preferably proximate to the front wheels 3, 3'.

Preferably, this joint is obtained using appropriate hinge means 11, which define a second oscillation axis $O_2$ substantially transverse and parallel to the support surface 2 and to the common rotation axis $R_1$ of the front wheels 3, 3' for the plates 6, 7 to oscillate relative to each other.

This ensures that the front wheels 3, 3' and rear wheels 4, 4' will always contact the ground, even when the road surface has relatively sharp gradients or irregularities.

Figure 4:
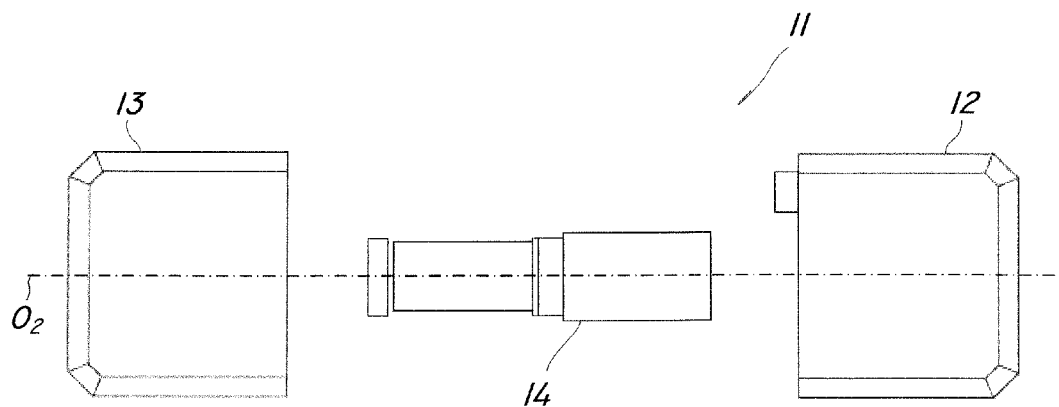
FIG. 4 is an exploded top view of a first detail of the structure of FIG. 1.

For example, as shown in FIG. 4, the hinge means 11 comprise a pair of female elements 12, 13, integral with respective plates 6, 7 and adapted for rotatable connection with opposite ends of a substantially transverse male element 4 that defines the second oscillation axis $O_2$.

In an alternative configuration of the invention, not shown, the hinge means 11 may comprise a semi-rigid element having a predetermined elastic capacity, and adapted to be twisted to a predetermined extent, for relative rotation of the plates 6, 7 with respect to the second oscillation axis $O_2$.

The connecting means 5 may comprise, for each rear wheel 4, 4', a pair of mutually facing inclined surfaces 15, 16; 15', 16' which are adapted to rotate about their respective first oscillation axes $O_1$, $O'_1$.

Each pair of inclined surfaces comprises a first surface 15, 15' integral with the support surface 2 and a second surface 16, 16' integral with the corresponding rear wheel 4, 4'.

Figure 5:
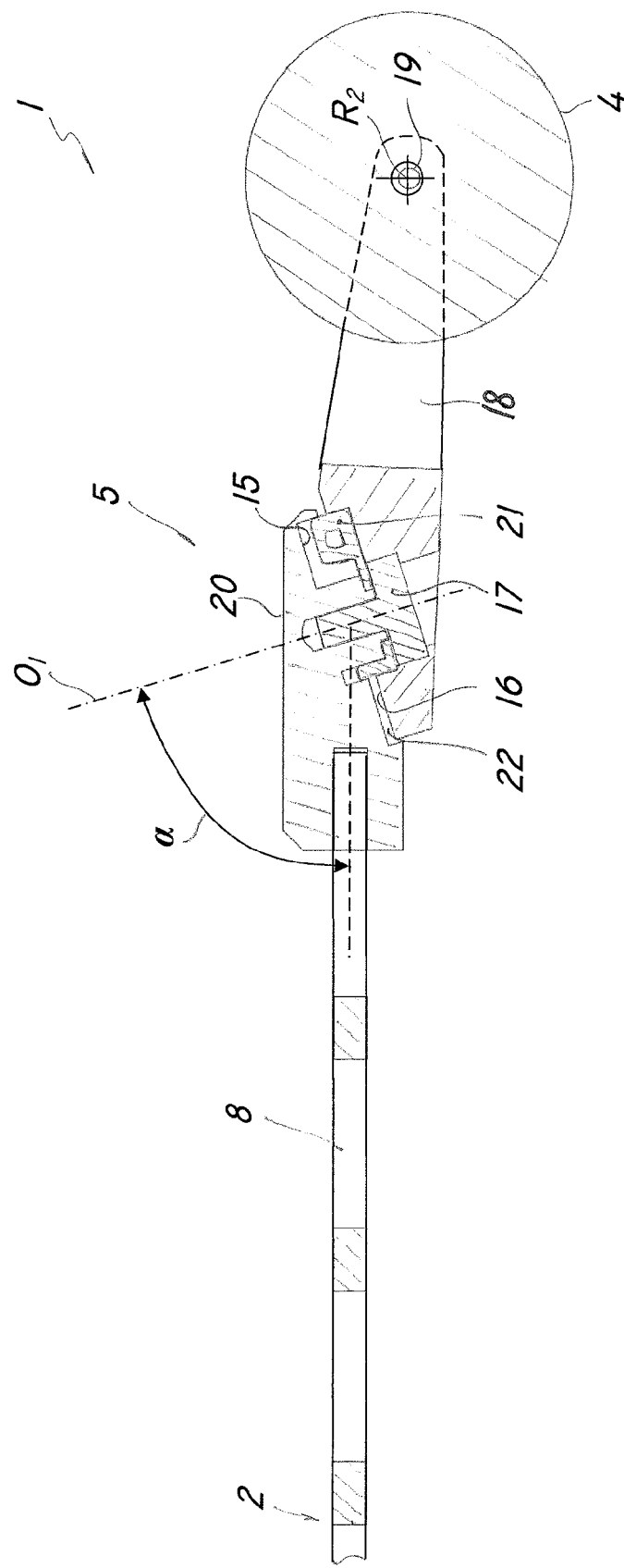
FIG. 5 is a sectional lateral view of the structure, as taken along the plane V-V of FIG. 2.

As shown in FIG. 5, the surfaces 15, 16; 15', 16' of each pair are parallel to each other and orthogonal to the corresponding pivot axes $O_1$, $O'_1$ and rotatably joined by a pivot, only one of which is visible in FIG. 5 and designated by numeral 17, or a similar member, such as a screw or a bolt, defining their respective first pivot axes $O_1$, $O'_1$.

Figure 6:
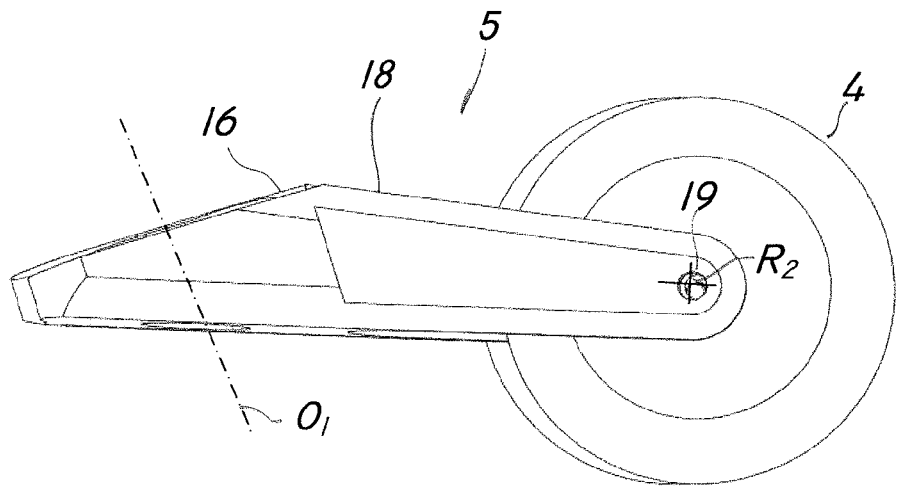
FIG. 6 is a lateral view of a second detail of the structure of FIG. 1.
Figure 7:
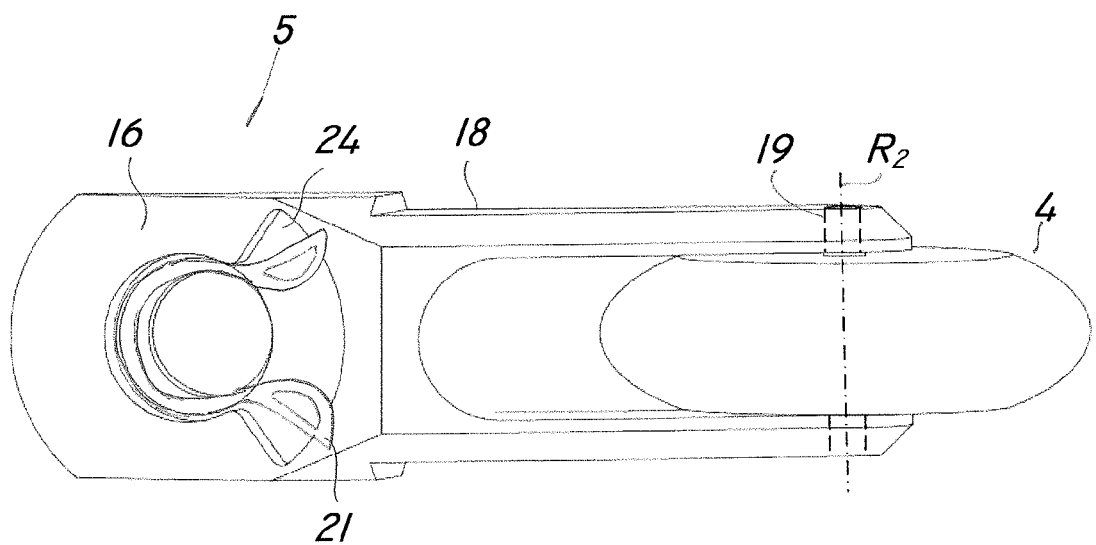
FIG. 7 is a top view of the detail of FIG. 6.

Conveniently, the connecting means 5 may comprise, for each of the rear wheels 4, 4', a fork element 18, 18', as more clearly shown in FIGS. 6 and 7, which has a hub 19, 19' at one end, supporting a respective first rotation axis $R_2$, $R'_2$ and a respective second inclined surface 16, 16' at the longitudinally opposite end.

Figure 8:
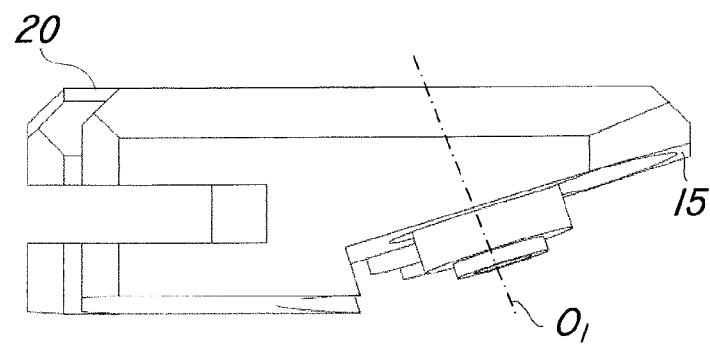
FIG. 8 is a lateral view of a third detail of the structure of FIG. 1.
Figure 9:
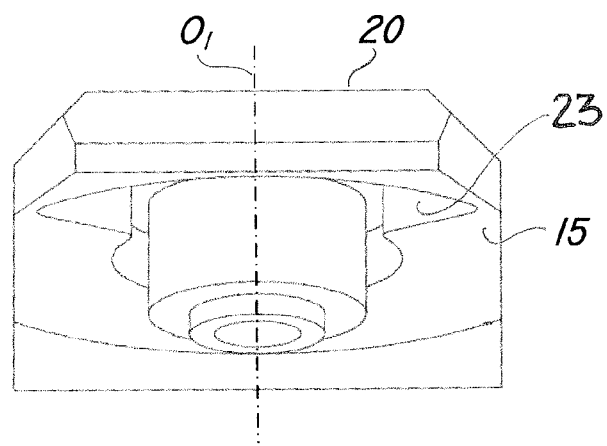
FIG. 9 is a front view of the detail of FIG. 8.
Figure 10:
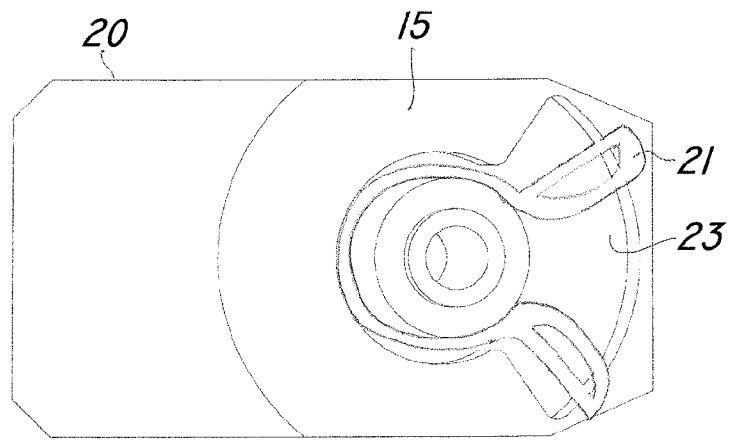
FIG. 10 is a bottom view of the detail of FIG. 8.

Conveniently, the connecting means 5 may comprise, for each of the rear wheels 4, 4', a pair of substantially prismatic connecting elements 20, 20', one of which is visible in detail in FIGS. 8 to 10, which are integral with a corresponding plate 6, 7 and comprise a respective first inclined surface 15, 15'.

The connecting means 5 may include, for each of the rear wheels 4, 4', an elastic member 21 for counteracting its swinging motion about its respective first oscillation axis $O_1$, $O'_1$ and applying a return torque thereon during use.

In the illustrated configuration, as more clearly shown in FIG. 10, the elastic members 21 are torsion springs interposed between the inclined surfaces 15, 16; 15', 16' of the corresponding pair, and placed at the periphery of the corresponding pivot 17.

Particularly, each elastic member 21 is held within a respective seat 22 between the corresponding inclined surfaces 15, 16, 15', 16', defined by substantially annular mutually facing recesses 23, 24, formed in such surfaces 15, 16, 15', 16'.

The elastic members may be also other than torsion springs and may be compression springs or other equivalent devices.

For example, in an alternative configuration of the invention, not shown, the elastic members may be helical springs connected at one end to the corresponding fork element 18, 18' proximate to the support hub 19, 19' and joined to the other end to the support surface 2.

In any case, the elastic member 21 has the function of applying a return torque to its respective rear wheel 4, 4' after oscillation thereof.

Conveniently, the elastic members 21 may be configured to apply a substantially zero return torque at a predetermined equilibrium position, which generally coincides with the substantially longitudinal position of the fork elements 18, 18'.

Furthermore, the elastic members 21 may be adapted to generate a return torque that increases as the pivoting angle of the corresponding rear wheel 4, 4' with respect to the longitudinal axis increases.

In a particularly advantageous aspect of the invention, as more clearly shown in FIG. 11, at least the second inclined surfaces 16, 16' may be mutually convergent toward the center plane π of the support surface 2.

Particularly, the second inclined surfaces 16, 16' form a predetermined second inclination angle β, β' or camber angle with the support surface 2, which advantageously ranges from 2° to 10° and is preferably close to 5°.

As a result, the rotation axes will also be inclined to the horizontal to form an angle μ, μ' coinciding with the camber angle β, β', for improved stability and steering of the structure 1 during riding, thereby allowing the user to ride along the desired path in a relatively easy and effortless manner.

Thus, the structure 1 will be easily used as a transport vehicle, even with no handlebar or other steering device.

Nevertheless, it shall be understood that the structure 1 of the invention may be also integrated in vehicles with handlebars or other steering devices, such as kick scooters or the like.

In a particular configuration, not shown, the support surface 2 may have an at least partially foldable configuration, to change from a first collapsed configuration for easy transport and storage, to a second open configuration, for use as a mean of transport, and vice versa.

For instance, each plate 6, 7 may be of modular type and may comprise a plurality of longitudinal sections, not shown, which are hinged together and can be folded to obtain the first collapsed configuration.

Likewise, one or more of the above described parts may be removably connected to the support surface 2 to allow at least partial disassembly of the structure 1.

In operation, for propulsion of the structure 1, the user will place his/her feet substantially parallel on the support surface 2, such that a torque substantially orthogonal to the plane 2 may be imparted thereto, by alternate oscillation of the pelvis, without having to lift the feet.

Such oscillatory movement will cause the rear wheels 4, 4' to swing about their respective first pivot axes, in the same swinging direction, as shown in FIGS. 12 to 15.

This will generate a reaction torque substantially parallel to the respective first oscillation axes $O_1$, $O'_1$, at the pivots 17.

The particular configuration of the connecting means 5 will cause this reaction to be resolved into two mutually orthogonal components, with one component F being substantially parallel to the support surface 2, and causing it to move forward.

Particularly, the oscillatory movement of the pelvis will provide a serpentine forward motion of the structure 1. Nevertheless, the provision of a camber angle β, β' will smoothen the curves and stabilize riding, thereby maintaining a substantially uniform path, even at increasing speed.

Furthermore, the alternate pressure applied by the feet will allow gradual speed increase, like in skiing.

The substantially constant height h of the support surface from the ground allows the user to steer along the path by slightly displacing the weight on either leg, as is typical for this kind of vehicles, with very little effort and under high safety and stability conditions, thereby allowing long-time use of the vehicle.

Furthermore, the particular configuration of the plane and the peculiar position of the wheels will afford fast U-turns with sharp radiuses, as compared with prior art vehicles.

The vehicle structure of the invention is susceptible of a number of changes and variants, within the inventive concept as disclosed in the appended claims. All the details thereof may be replaced by other technically equivalent parts, and the materials may vary depending on different needs, without departure from the scope of the invention.

For example, the support surface may be ma de of metal or a metal alloy, one or more polymeric materials possibly filled with fibers to obtain composite materials, otherwise it may be made of wood or any material having a sufficient strength to support the user load and motion stresses.

While the vehicle structure has been described with particular reference to the accompanying figures, the numerals referred to in the disclosure and claims are only used for the sake of a better intelligibility of the invention an shall not be intended to limit the claimed scope in any manner.

The invention claimed is:

1. A rider propelled wheeled vehicle structure, comprising:
   a support surface (2) configured to support a user's feet and defining a longitudinal axis (L), said support surface (2) being formed by a first board (6) and a second board (7) which are substantially planar;
   a pair of front wheels (3, 3') and a pair of rear wheels (4, 4') associated with said support surface (2);
   connecting means (5) for rotatably connecting said rear wheels (4, 4') to said support surface (2), said connecting means (5) being adapted to allow an oscillation of said rear wheels (4, 4') about a first oscillation axis inclined with respect to said support surface (2);
   wherein said rear wheels (4, 4') have respective first pivot axes ($O_1$, $O'_1$) independent and transversally offset with respect to each other for at least partially transferring to said rear wheels (4, 4') a propulsion exerted by the user on said support surface (2) and generating a reaction substantially parallel thereto to thereby promote a forward motion;
   wherein said first board (6) and said second board (7) are reciprocally fastened at respective reciprocally facing and parallel longitudinal edges (9, 10) by hinged means (11) defining a substantially transverse second oscillation axis ($O_2$); and
   wherein said second oscillation axis ($O_2$) is substantially parallel to said support surface (2), said front wheels (3, 3') being mounted idle to a transverse common rotation axis ($R_1$) fixed with respect to said support surface (2) and substantially parallel to said second oscillation axis ($O_2$).

2. The rider propelled wheeled vehicle structure claimed in claim 1, wherein said connecting means (5) are adapted to allow the rotation of said rear wheels (4, 4') about respective substantially transverse rotation axes ($R_2$, $R'_2$), said first pivot axes ($O_1$, $O'_1$) being inclined with respect of said support surface (2) and having substantially a same longitudinal distance ($l_1$, $l_2$) from the respective rotation axis ($R_1$, $R'_2$).

3. The rider propelled wheeled vehicle structure as claimed in claim 2, wherein said first pivot axes ($O_1$, $O_2$) are inclined with respect of said support surface (2) with same predetermined first inclination angles (α, α') comprised between 45° and 85°.

4. The rider propelled wheeled vehicle structure as claimed claim 1, wherein said support surface (2) has a predetermined height (h) with respect to the ground (G), said height (h) being substantially constant during the oscillation of said rear wheels (4, 4').

5. The rider propelled wheeled vehicle structure as claimed in claim 4, wherein said first board (6) and said second board (7) are symmetrical relative to a center line (π) of said support surface (2) and associated with respective front wheels (3, 3') and rear wheels (4, 4'), each of said first and second boards (6, 7) defining a respective support for a substantially parallel positioning of the user's feet.

6. The rider propelled wheeled vehicle structure as claimed in claim 5, wherein said connecting means (5) comprise for each of said rear wheels (4, 4') a pair of inclined plane surfaces (15, 16; 15', 16') reciprocally facing and rotatable about the corresponding first oscillation axes ($O_1$, $O'_1$).

7. The rider propelled wheeled vehicle structure as claimed in claim 6, wherein each of said pairs of inclined plane surfaces (15, 16; 15', 16') comprises a first inclined surface (15, 15') integral with said support surface (2) and a second inclined surface (16, 16') integral with the corresponding rear wheel (4, 4'), the inclined surfaces (15, 16; 15', 16') of each pair being orthogonal to the corresponding first oscillation axes ($O_1$, $O'_1$).

8. The rider propelled wheeled vehicle structure as claimed in claim 7, wherein said second inclined plane surfaces (16, 16') are reciprocally converging toward said center line ($\pi$) of said support surface (2) with second inclination angles ($\beta$, $\beta'$) relative to said support surface (2) ranging between 2° and 10°.

9. The rider propelled wheeled vehicle structure as claimed in claim 7, wherein said connecting means (5) comprise for each of said rear wheels (4, 4') an elastic member (21) adapted to counter the oscillation thereof.

10. The rider propelled wheeled vehicle structure as claimed in claim 9, wherein said elastic member (21) comprises a torsion spring interposed between the inclined plane surfaces (15, 16; 15', 16') of the corresponding pair of inclines plane surfaces.

11. The rider propelled wheeled vehicle structure as claimed in claim 1, wherein said support surface (2) is at least partially foldable for changing between a first collapsed transport and storing configuration and a second opened operating configuration.

* * * * *